Figure 5:
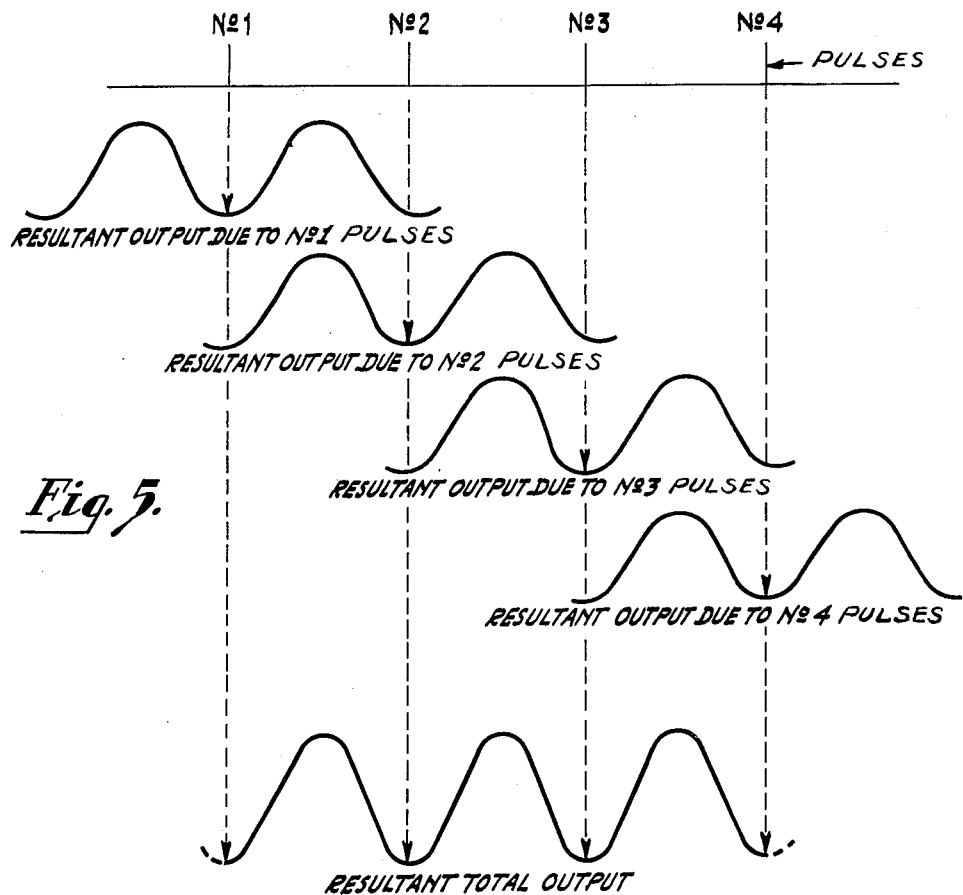

Dec. 16, 1952 E. O. KEIZER 2,622,241
DEVICE FOR CALIBRATING FREQUENCY
MODULATED RADAR EQUIPMENT
Filed Feb. 25, 1946 3 Sheets-Sheet 1
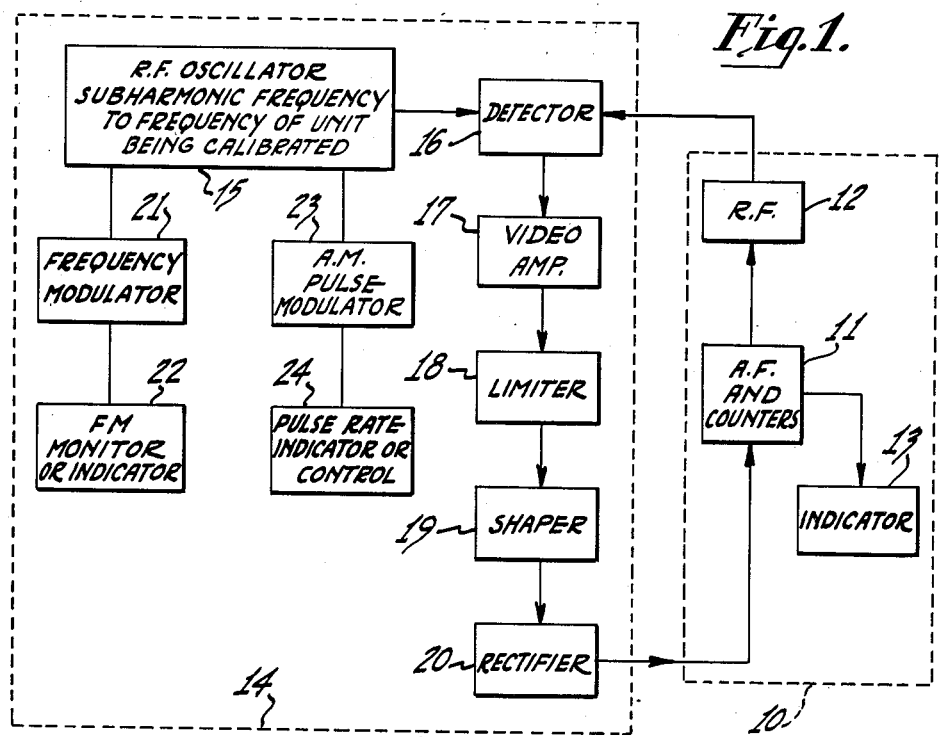
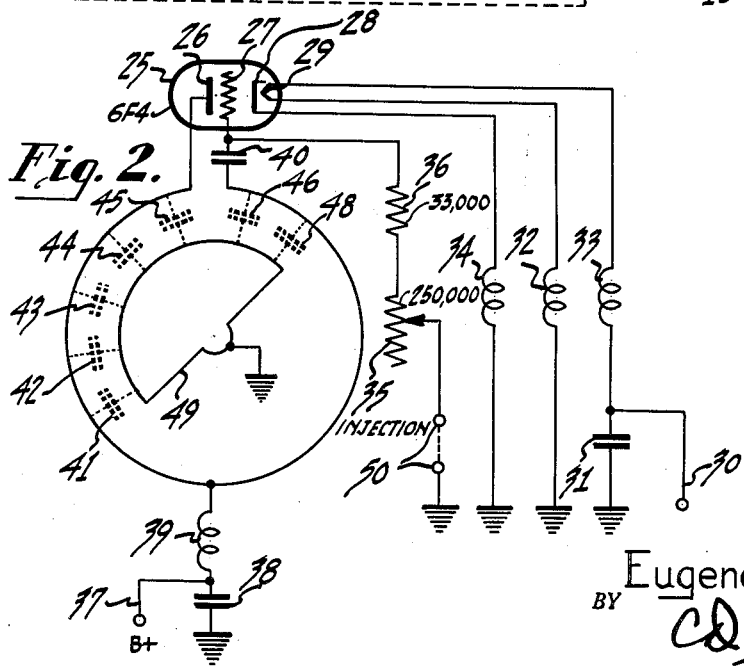
INVENTOR.
Eugene O. Keizer
BY
ATTORNEY Dec. 16, 1952  E. O. KEIZER  2,622,241
DEVICE FOR CALIBRATING FREQUENCY
MODULATED RADAR EQUIPMENT
Filed Feb. 25, 1946  3 Sheets-Sheet 2
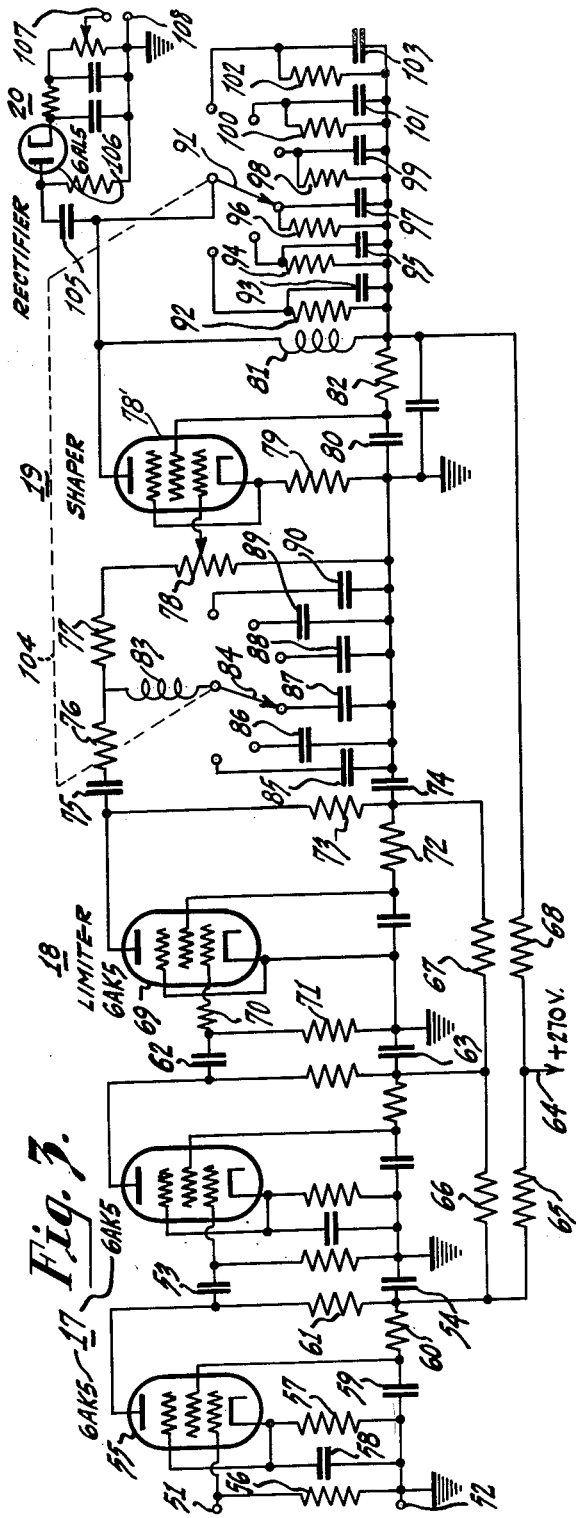
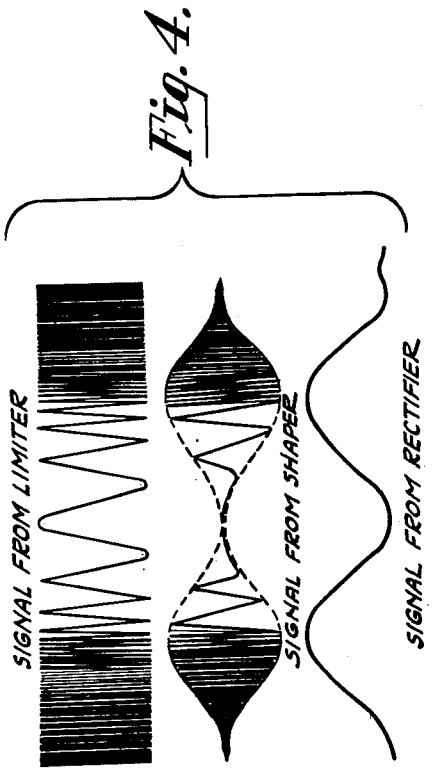
INVENTOR.
Eugene O. Keizer
BY
ATTORNEY Dec. 16, 1952  E. O. KEIZER  2,622,241
DEVICE FOR CALIBRATING FREQUENCY
MODULATED RADAR EQUIPMENT
Filed Feb. 25, 1946  3 Sheets-Sheet 3

SQUARE LAW ROTOR SHAPE

INVENTOR.
Eugene O. Keizer
BY
ATTORNEY

Patented Dec. 16, 1952

2,622,241

UNITED STATES PATENT OFFICE 2,622,241

DEVICE FOR CALIBRATING FREQUENCY MODULATED RADAR EQUIPMENT

Eugene O. Keizer, Princeton, N. J., assignor to Radio Corporation of America, a corporation of Delaware Application February 25, 1946, Serial No. 650,049

2 Claims. (Cl. 343—14)

This invention relates to calibrating devices such as are useful in calibrating a frequency modulated radar equipment installed on a moving vehicle, and has for its principal object the provision of an improved calibrating device and method of operation whereby a radar equipment may be calibrated readily and accurately to indicate the distance of the moving vehicle from an object which reflects the transmitted signal back to the radar equipment located on the moving vehicle.

In the calibration of frequency modulated radar equipment, a transmission line connected between the transmitter and receiver of the radar equipment will yield the same effect as a reflecting object located at a distance equal to one-half the electrical length of the transmission line. This effect is useful in calibrating the radar equipment. The maximum length of transmission line that will return a usable signal from the transmitter of the radar equipment to its receiver, however, is limited due to attenuation and becomes shorter as the operating frequency of the radar equipment increases. This means that for some types of radar equipments the operation at maximum rated distances cannot be calibrated, and for other types of radar equipment the overall operation cannot be checked easily anywhere within the distance range over which the equipment operates. This difficulty has resulted in calibration procedures which are indirect or have involved extrapolation to cover some of the distances over which the equipment operates. Such procedures are somewhat involved and leave something to be desired from the viewpoint of accuracy.

In accordance with the present invention, these difficulties are avoided by the provision of an improved calibrating device and method of operation whereby a synthetic audio frequency signal dependent on the frequency modulated output of the radar equipment and on signals developed by the calibrating device is applied to the receiver of the radar equipment and utilized to provide the required calibration. Developed within the calibrating device are signals equally spaced in frequency over a frequency band which may be adjusted to include the frequency at which the equipment to be calibrated is operating. These signals will be referred to as "side frequencies" although they are not necessarily generated as true side frequencies in the usual sense. Thus when a frequency modulated signal derived from the transmitter of the radar equipment to be calibrated is mixed with the band of signals developed by the calibrating device a number of beat notes of varying frequency will be produced. These beat notes are amplified, limited to a maximum level, passed through a selective filter system called a "shaper," and are then rectified with a peak detector to produce an audio signal. This rectified audio signal is applied to the audio amplifier and counters of the receiver of the radar equipment. With this procedure, the audio signal used in the calibration is dependent on the frequency modulation characteristics of the radar equipment so that ready and accurate calibration over the entire operating range is realized.

Important objects of the present invention are the provision of an improved calibrating device which does not involve the use of the transmission lines heretofore proposed for this purpose; and the provision of a calibrating device which is accurate and readily operated without extrapolation.

The invention will be better understood from the following description considered in connection with the accompanying drawings and its scope is indicated by the appended claims.

Figure 6:
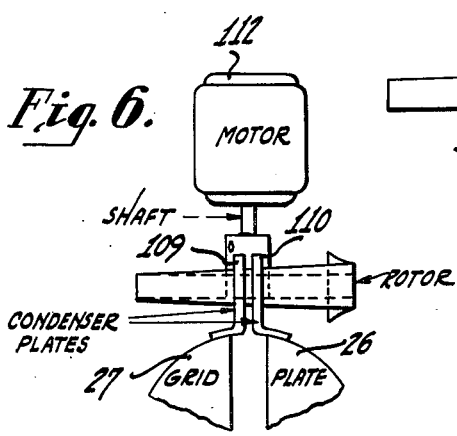
Figure 7:
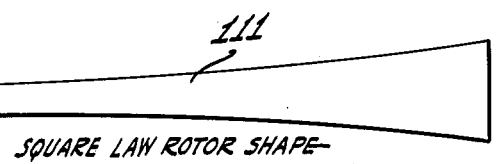

Referring to the drawings:

Figure 1 is a block diagram indicating the relation between the calibrating device which is shown at the left and the equipment to be calibrated which is shown at the right, Figure 2 is a wiring diagram of one type of the "RF oscillator" of Figure 1, Figure 3 is a wiring diagram of the "video amplifier," "limiter," "shaper" and "rectifier" of Figure 1, Figures 4 and 5 are explanatory diagrams relating to the operation of the improved calibrating device, and Figures 6 and 7 illustrate the details of means which may be provided in the calibrating device for taking into account the speed of a vehicle in which the equipment to be calibrated is to be operated.

Fig. 1 shows the equipment to be calibrated as including an audio frequency amplifier and counter element 11, a radio frequency element 12 and an element 13 for indicating the count by which the distance from the vehicle to the reflecting object is indicated. Other elements common to a radar are not shown for the reason that they are not essential to an understanding of the present invention. It is, of course, apparent that the radar equipment includes, among other things, transmitting and receiving antennae and that such antennae may be utilized to transmit energy between the calibrating device and the equipment to be calibrated instead of the illustrated conductive connection.

The calibrating device 14 includes an oscillation generator 15, a detector 16, an amplifier 17, a limiter 18, a wave shaper 19, a rectifier 20, a frequency modulator 21 which is connected to a frequency modulation monitor or indicator 22, and an amplitude or pulse modulator 23 which is connected to a pulse rate indicator or controller 24. The frequency modulator 21 and monitor or indicator 22 are used only where the speed of the vehicle must be taken into account in the calibration. Frequency modulated potential derived from the radio frequency element 12 is modulated by the side frequencies delivered from the generator 15 and the resulting beat notes are detected by the rectifier 20. The resulting audio potential is applied to the audio frequency and counter element 11 and is indicated by the indicator 13. Since the pulse rate of the calibrating device is known, the control elements of the equipment to be calibrated are readily adjusted to provide indications in terms of the distance between the equipment to be calibrated and a reflecting object.

Figure 2 shows the connections of one form of the side frequency generator 15. This form operates as a self-quenched oscillator, thus producing pulses depending upon the quenching rate. It is well known that such an oscillator produces a large number of side frequencies spaced in frequency by the frequency of the quench-rate. It includes a triode 25 having an anode 26, a grid 27, a cathode 28 and a cathode heater 29. Current is supplied to the heater 29 from a 6.3 volt terminal 30 which is bypassed to ground by a capacitor 31 and is connected to the heater through coils 32 and 33. The cathode 28 is grounded through a coil 34. Bias potential is applied to the grid 27 through an adjustable 250,000 ohm resistor 35 and a resistor 36 of 33,000 ohms. Potential is applied to the anode 26 from a +B terminal 37 which is bypassed to ground by a capacitor 38 and is connected to the anode through a coil 39. The grid 27 is coupled through a capacitor 40 to the upper terminal of the coil 39.

When the side frequency generator of Fig. 2 is a self-pulsed radio frequency oscillator, the external pulse modulator 23 is not required. The pulse modulation of the radio frequency oscillator functions to produce side frequencies spaced in frequency by the pulsing rate. This is seen by making an analysis of uniformly repeated pulses, which shows they are the equivalent of the combination of a sine wave of frequency equal to the pulse rate, plus a sine wave of approximately equal amplitude for each harmonic of the pulse rate. Thus the output of the self-pulsed oscillator of Figure 2 will consist of a carrier and a number of side-frequencies centered about it resulting in a band of signals equally spaced in frequency and approximately of equal amplitude. The fundamental frequency of the generator can be the same as that of the equipment to be calibrated or can be lower in which case a harmonic of the generator frequency must be of approximately the same frequency as the fundamental frequency of the unit to be calibrated. The frequency to which the generator is set is not critical and the same is true of its stability. In order to eliminate interaction between the calibrating device and the equipment to be calibrated, the use of a harmonic of the generator is preferred. Use of such a harmonic does not alter the spacing of the side bands.

Since the pulsing rate determines the distance portion of the calibration of the output signal of the equipment to be calibrated, it must be accurately known. This can be done by controlling it with a signal of known frequency injected into the grid circuit at the terminals 50 or by monitoring it by the pulse rate control device 24. To represent a given distance, for any type of frequency modulation radar equipment, the pulsing rate is of course made such that the time interval between pulses is equal to the time interval between the transmission and return of a signal from a reflecting object located at that distance. In actual use of the equipment to be calibrated with such a reflecting object the frequency of the audio signal appearing in the counter circuits is the change in transmitter frequency during the time interval between transmission and return of the reflected signal, which may be expressed as: rate of change of transmitter frequency multiplied by time interval during transmission. When using the calibrating device one cycle of audio signal is supplied to the counter circuits of the equipment to be calibrated when the transmitter of the latter equipment changes in frequency by the amount separating the side frequencies of the calibrating device, and the audio frequency is: rate of change transmitter frequency divided by side frequency separation.

Since the side frequency separation is the pulse rate which is the reciprocal of the interval between pulses, the audio frequency supplied by the calibrating device is: rate of change of transmitter frequency multiplied by time interval between pulses. Thus a given time interval between pulses when using the calibrating device will produce the same audio signal in the counter circuits of the equipment to be calibrated as will the reflected signal in actual use from an object or target when the total time interval of transmission is the same.

In calibration the procedure is to: (1) couple a small portion of the frequency-modulated output of the equipment to be calibrated to the calibrating device, (2) set the time interval between pulses equal to the time interval required for a radio wave to travel to and from a given distance, (3) couple the audio signal from the calibrating device to the equipment to be calibrated, and (4) make the proper adjustments on the equipment to be calibrated for the given distance chosen in (2).

The output of the generator 15 (Fig. 1) and a small portion of the output from the equipment to be calibrated are coupled into the detector 16 which may be a crystal rectifier. With these connections, the output of an equipment to be calibrated sweeps across the multiple side frequencies of the generator to produce a varying-frequency beat note in the detector output for each side frequency. These beatnotes are then limited in maximum amplitude and passed through a selective filter called a "shaper." The purpose of this "shaper" is to form the response to a beatnote as it changes in frequency from zero to that of the pulse rate into approximately that of one cycle of a sine wave with miximum response at a frequency equal to half that of the pulse rate and minimum response at zero frequency and at a frequency equal to the pulse rate. This is illustrated in Figure 4. The output of the "shaper" is detected to produce the audio output which will be used for the counter circuits of the equipment to be calibrated. As the beatnote from a given sideband varies through zero frequency the total signal from the rectifier will appear as illutrated in Figure 4. However, the beatnotes from adjacent side frequencies will also be present and their response must be added to obtain the total signal from the rectifier. As the frequency of the transmitter of the equipment to be calibrated varies across the band occupied by the side frequencies the resultant total output with respect to frequency is shown in Figure 5.

The resultant total output of the detector 16 is applied to the input terminals 51—52 (Fig. 3) of the channel including the amplifier 17, the limiter 18, the shaper 19 and the rectifier 20.

The amplifier 17 includes two identical stages which are coupled together through a 100 microfarad capacitor 53 and a 16 microfarad capacitor 54. Thus the first stage includes a pentode 55 which has a 100,000 ohm grid leak resistor connected across its input terminals 51—52, a 200 ohm cathode lead resistor 57 shunted by a .05 microfarad capacitor 58, a .05 microfarad capacitor 59 connected between its screen grid and ground, a 160,000 ohm resistor 60 through which positive potential is applied to its screen grid, and a 51,000 ohm resistor 61 through which +B potential is applied to its anode. The second amplifier stage is identical with the first and has its output coupled to the limiter 18 through a 100 microfarad capacitor 62 and a 16 microfarad capacitor 54.

Potential is applied from a +270 volt +B terminal 64 (1) through a 510 ohm resistor 65 to the first stage, (2) through the resistor 65 and a 1000 ohm resistor 66 to the second stage, (3) through the resistors 65, 66 and a 68,000 ohm resistor 67 to the limiter 18, and (4) through a 12,000 ohm resistor 68 to the shaper 19. Each tube of the channel, with the exception of the rectifier, is a pentode and the cathodes of all these pentodes are connected in parallel with one side of each cathode grounded.

The limiter 18 includes a pentode 69 which has a 12,000 ohm grid input resistor 70, a 15,000 ohm grid leak resistor 71, and a .05 microfarad capacitor connected between its cathode and screen grid. Positive potential is applied to its screen grid and anode respectively through a 47,000 resistor 72 and a 27,000 ohm resistor 73. With these circuit constants, the limiter functions to insure that all the useful beat notes delivered from the detector 16 and amplified by the amplifier 17 are made to have the same amplitude or level when they reach the shaper 19 to which the limiter is coupled through an 8 microfarad capacitor 74, a 270 microfarad capacitor 75, a 47,000 ohm resistor 76 and a 12,000 ohm resistor 77.

These beat notes of the same level pass from the limiter into the shaper 19 which produces an audio frequency cycle for each side frequency of the generator swept over by the output of the equipment being calibrated.

The shaper 19 includes a pentode 78 which has its control grid connected to an adjustable terminal of a resistor 78, its cathode grounded through a resistor 79, its screen grid coupled to its cathode through a .05 ohm resistor 80, and its operating potential applied to its anode through a coil 81 and to its screen grid through a 27,000 ohm resistor 82. The input resistor 78 is shunted by a coil 83 connected to a movable contact 84 which is moved to connect in series with the coil 83 a 33 microfarad capacitor 85, an 82 microfarad capacitor 86, a 200 microfarad capacitor 87, a 510 microfarad capacitor 88, an 820 microfarad capacitor 89 or a 2400 microfarad capacitor 90. The output coil 81 is shunted by a slider 91 which is moved to connect it in series with a 6800 ohm resistor 92 shunted by a 220 microfarad capacitor 93, a 6800 ohm resistor 94 shunted by a 470 microfarad capacitor 95, a 47,000 ohm resistor 96 shunted by a 1100 microfarad capacitor 97, a 3300 ohm resistor 98 shunted by a 2400 microfarad capacitor 99, a 1500 ohm resistor 100 shunted by a 5700 microfarad capacitor 101 or an 1800 ohm resistor 102 shunted by a .01 microfarad capacitor 103. The sliders or movable contact members 84 and 91 may be arranged to be moved together as indicated by the dotted lines.

By means of the selector switch 104, the shaper circuits are peaked at a frequency equal to half the separation of the side frequencies, having a low-frequency cut and a rejection at twice its peak response frequency. The proper setting of the selector switch 104 for determining the frequency response of the shaper circuits is not critical so that it may be ganged with the pulse rate control of the side band generator for single control operation.

The output of the shaper 19 is applied through a 570 microfarad coupling capacitor 105 to a rectifier 106 which delivers through a filter network and the output terminals 107—108 an audio frequency potential having one cycle for each side frequency of the generator.

Fig. 4 shows the form of the signal as it appears respectively at the output of the limiter, at the output of the shaper, and at the output of the rectifier. From what has been said, it follows that one cycle of audio frequency potential is produced at the output of the rectifier for each side frequency of the generator and that each cycle of the audio frequency potential represents a unit of the equipment to be distance between the calibrated and the reflecting object. These cycles are counted and indicated by the counter of the equipment to be calibrated so that the calibration is dependent upon the frequency modulation characteristics of the particular equipment being calibrated and a high degree of accuracy in the operation of the calibrated equipment is insured.

In cases where the speed of the vehicle on which the equipment to be calibrated is to be located must be taken into account in the calibration, this is effected by applying a sawtooth frequency modulation to the side band generator. This causes the side frequencies to shift in frequency in one direction except for the sharp return snaps of the sawtooth wave. When the transmitter frequency of the equipment to be calibrated sweeps in the same direction as the side frequencies are moving, it overtakes them more slowly than when it sweeps in the opposite direction. Thus two audio frequency signals are produced, the one during the transmitter sweep in increasing frequency direction and the other during the transmitter sweep in decreasing frequency direction. This result is similar to that found in actual use of the radar equipment where there is relative motion between it and a reflecting target.

The required sawtooth frequency modulation may be produced by a rotating capacitor. The capacitor 109—110—111 of Figs. 6 and 7 is suitable for this purpose. It includes a plate 109 which is connected to the grid 27 of the triode 25 (Fig. 2), a plate 110 which is connected to the anode 26 of this same triode, and a rotor 111 which is driven by a motor 112. The shape of the rotor 111 is shown more clearly in Fig. 7.

To provide a good sawtooth characteristic the face of the rotor 111 was found to require the shape shown in Fig. 7. The plates 109 and 110 are thin strips placed close to the rotor 111 and at right angles to its direction of rotation so that the amount of frequency modulation for each rotation of the rotor 111 is fixed.

By increasing the rotational speed of the rotor 111, the amount of effective speed in the calibrating signal can be increased and vice versa. To monitor the rotational speed of the capacitor, a small iron core pickup coil is mounted alongside the driving motor, with a shunt capacitor to resonate the response of the coil and to bypass extraneous high frequencies. The output of this coil is used to operate an indicator or may be monitored by an oscillograph and external audio generator. Because the amount of speed introduced into the calibration depends on the characteristics of the individual sawtooth generator, the calibrating device itself must be calibrated in order to provide speed information. Such calibration, of course, is not required where only distance or range information is required.

In cases where conductive connections between the calibrating device and the equipment to be calibrated are inconvenient or impossible, the required signals may be transmitted between the two over wireless channels. Thus the audio signal may function to amplitude modulate an oscillator which transmits back to the radio receiver of the calibrated equipment. If such an oscillator is tuned somewhat outside the frequency range of the transmitter of the equipment to be calibrated, extraneous beat notes are avoided. Wireless return of the audio signal to the calibrated equipment, along with the need for only a small amount of coupling to the transmitter of this equipment has the advantage that it makes it possible to calibrate an equipment without removing it from a vehicle or other support on which it is mounted.

What the present invention provides is an improved calibrating device and method of operation whereby a radar equipment, an altimeter or the like may be calibrated accurately to indicate the distance between it and an object from which waves are reflected back to it, such calibration being effected by sweeping the frequency modulated output of the equipment to be calibrated over a series of side frequencies produced by the calibrating device and making available an audio frequency signal which represents the desired distance and is counted and indicated by the calibrating device.

I claim as my invention:

1. In a device for calibrating a radar equipment having a frequency modulated output and having an indicator which is to be calibrated to indicate the distance from said equipment to an object from which said output is reflected, the combination of means for producing pulses at a predetermined rate, means for adjusting said rate to selected values, means for indicating said values, means for mixing said pulses with the output of said radar equipment to produce beat notes occurring at said rate, means responsive to said beat notes for producing an audio frequency signal, and means for applying said audio signal to said indicator which is to be calibrated.

2. In a device for calibrating a radar equipment having a frequency modulated output and having an indicator which is to be calibrated to indicate the distance from said equipment to an object from which said output is reflected, the combination of means for producing pulses at a predetermined rate, means for adjusting said rate to selected values, means for indicating said values, means for mixing said pulses with the output of said radar equipment to produce beat notes occurring at said rate, means responsive to said beat notes for producing an audio frequency signal, means for applying said audio signal to said indicator which is to be calibrated, and means for adjusting said rate to compensate the effect of movement of said equipment with respect to said object.

EUGENE O. KEIZER.

REFERENCES CITED

The following references are of record in the file of this patent:

UNITED STATES PATENTS

| Number | Name | Date |
|---|---|---|
| Re. 21,955 | Chaffee | Nov. 25, 1941 |
| 2,176,742 | La Pierre | Oct. 17, 1939 |
| 2,248,599 | Alexanderson | July 8, 1941 |
| 2,324,077 | Goodale et al. | July 13, 1943 |
| 2,408,742 | Eaton | Oct. 8, 1946 |
| 2,418,538 | Yetter | Apr. 8, 1947 |
| 2,420,211 | Tourshou | May 6, 1947 |
| 2,421,016 | Deloraine et al. | May 27, 1947 |
| 2,422,064 | Anderson et al. | June 10, 1947 |
| 2,423,644 | Evans | July 8, 1947 |
| 2,433,804 | Wolff | Dec. 30, 1947 |